(12) United States Patent
Arao et al.

(10) Patent No.: US 10,444,439 B2
(45) Date of Patent: Oct. 15, 2019

(54) OPTICAL CONNECTOR AND OPTICAL COUPLING STRUCTURE

(71) Applicant: SUMITOMO ELECTRIC INDUSTRIES, LTD., Osaka-shi, Osaka (JP)

(72) Inventors: Hajime Arao, Yokohama (JP); Tomomi Sano, Yokohama (JP); Osamu Shimakawa, Yokohama (JP); Masakazu Fukuda, Yokohama (JP); Takako Hosokawa, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/770,265

(22) PCT Filed: Oct. 18, 2016

(86) PCT No.: PCT/JP2016/080863
§ 371 (c)(1),
(2) Date: Apr. 23, 2018

(87) PCT Pub. No.: WO2017/073408
PCT Pub. Date: May 4, 2017

(65) Prior Publication Data
US 2018/0321446 A1   Nov. 8, 2018

(30) Foreign Application Priority Data

Oct. 26, 2015   (JP) ................................ 2015-210090

(51) Int. Cl.
*G02B 6/36* (2006.01)
*G02B 6/38* (2006.01)

(52) U.S. Cl.
CPC ......... *G02B 6/3822* (2013.01); *G02B 6/3885* (2013.01); *G02B 6/3853* (2013.01); *G02B 6/3882* (2013.01)

(58) Field of Classification Search
CPC .. G02B 6/3822; G02B 6/3882; G02B 6/3853; G02B 6/3885
See application file for complete search history.

(56) References Cited

U.S. PATENT DOCUMENTS 5,066,094 A * 11/1991 Takahashi .............. G02B 6/266
385/140
5,082,378 A    1/1992 Muller et al.
(Continued)

FOREIGN PATENT DOCUMENTS

JP   H03-120504 A    5/1991
JP   2003-307647 A   10/2003
(Continued)

*Primary Examiner* — Ellen E Kim
(74) *Attorney, Agent, or Firm* — Drinker Biddle & Reath LLP

(57) ABSTRACT

An optical connector is disclosed. The optical connector includes an optical fiber, a ferrule that holds the optical fiber, the ferrule having a flat ferrule end surface facing a counterpart optical connector, and a spacer provided on the ferrule end surface so as to define a clearance between the ferrule end surface and the counterpart optical connector. A tip surface of the optical fiber is exposed at the ferrule end surface. Respective normal directions to the tip surface of the optical fiber and the ferrule end surface are inclined with respect to an optical-axis direction of the optical fiber in a section along an optical axis of the optical fiber. The spacer includes an opening configured to allow an optical path extending from the tip surface of the optical fiber to pass therethrough.

14 Claims, 8 Drawing Sheets

(56) References Cited

U.S. PATENT DOCUMENTS

| | | | | |
|---|---|---|---|---|
| 5,319,733 | A * | 6/1994 | Emmons | G02B 6/266 |
| | | | | 385/140 |
| 6,012,852 | A * | 1/2000 | Kadar-Kallen | G02B 6/32 |
| | | | | 385/74 |
| 6,048,102 | A * | 4/2000 | Fukushima | G02B 6/3821 |
| | | | | 385/140 |
| 9,366,830 | B2 * | 6/2016 | Levin | G02B 6/3818 |
| 2003/0026540 | A1 * | 2/2003 | Fukuzawa | G02B 6/2937 |
| | | | | 385/34 |
| 2011/0026884 | A1 * | 2/2011 | Hikosaka | G02B 6/3822 |
| | | | | 385/72 |
| 2011/0182586 | A1 * | 7/2011 | Ji | G02B 6/2937 |
| | | | | 398/88 |
| 2012/0093462 | A1 | 4/2012 | Childers et al. | |
| 2012/0201494 | A1 | 8/2012 | Suzuki | |
| 2013/0064509 | A1 * | 3/2013 | Byer | G02B 6/3818 |
| | | | | 385/72 |
| 2014/0193120 | A1 * | 7/2014 | Hodge | G02B 6/3885 |
| | | | | 385/79 |
| 2014/0270650 | A1 | 9/2014 | Kasten et al. | |
| 2015/0104135 | A1 * | 4/2015 | Bushnell | G02B 6/3885 |
| | | | | 385/79 |
| 2016/0282562 | A1 * | 9/2016 | Takamizawa | G02B 6/325 |

FOREIGN PATENT DOCUMENTS

| | | |
|---|---|---|
| JP | 2007-65490 A | 3/2007 |
| JP | 2012-163922 A | 8/2012 |
| JP | 2014-182379 A | 9/2014 |
| JP | 2016-184106 A | 10/2016 |

* cited by examiner

US 10,444,439 B2

OPTICAL CONNECTOR AND OPTICAL COUPLING STRUCTURE

TECHNICAL FIELD

The present invention relates to an optical connector and an optical coupling structure.

The present application claims priority based on Japanese Patent Application No. 2015-210090 filed on Oct. 26, 2015, and this Japanese Patent Application is incorporated herein by reference in its entirety.

BACKGROUND ART

Patent Literature 1 discloses a ferrule used for an optical connector for connecting a plurality of optical fibers to each other. This ferrule includes holes for holding bare optical fibers, an inner surface contacting with tip portions of the bare optical fibers to position the tip portions, a recessed portion formed in an end surface thereof and in front of the inner surface, and lenses formed integrally with the recessed portion.

CITATION LIST

Patent Literature

[Patent Literature 1] US Patent Application Publication No. 2012/0093462

SUMMARY OF INVENTION

An optical connector according to one embodiment of the present invention comprises an optical fiber, a ferrule that holds the optical fiber, the ferrule having a flat ferrule end surface facing a counterpart optical connector, and a spacer provided on the ferrule end surface so as to define a clearance between the ferrule end surface and the counterpart optical connector. A tip surface of the optical fiber is exposed at the ferrule end surface. Respective normal directions to the tip surface of the optical fiber and the ferrule end surface are inclined with respect to an optical-axis direction of the optical fiber in a section along an optical axis of the optical fiber. The spacer includes an opening configured to allow an optical path extending from the tip surface of the optical fiber to pass therethrough.

An optical coupling structure according to one embodiment of the present invention includes first and second optical connectors configured to be connected to each other. The first and second optical connectors each comprise an optical fiber and a ferrule that holds the optical fiber, the ferrule having a flat ferrule end surface. The ferrule end surface of the first optical connector and the ferrule end surface of the second optical connector face each other. Tip surfaces of the optical fibers are exposed at the respective ferrule end surfaces of the first and second optical connectors, and respective normal directions to the tip surfaces of the optical fibers and the ferrule end surfaces are inclined with respect to an optical-axis direction of the optical fibers in a section along optical axes of the optical fibers. The optical coupling structure further comprises a spacer configured to define a clearance between the ferrule end surface of the first optical connector and the ferrule end surface of the second optical connector. The spacer has an opening configured to allow an optical path extending between the tip surface of the optical fiber of the first optical connector and the tip surface of the optical fiber of the second optical connector to pass therethrough.

DESCRIPTION OF EMBODIMENTS

Problem Solved by Disclosure

Figure 7A:
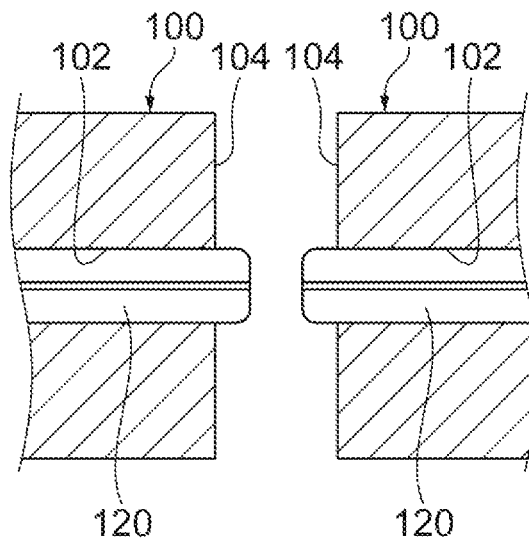
FIG. 7A is a sectional side view illustrating one example of a structure of a PC-type ferrule, which illustrates a state before connection.
Figure 7B:
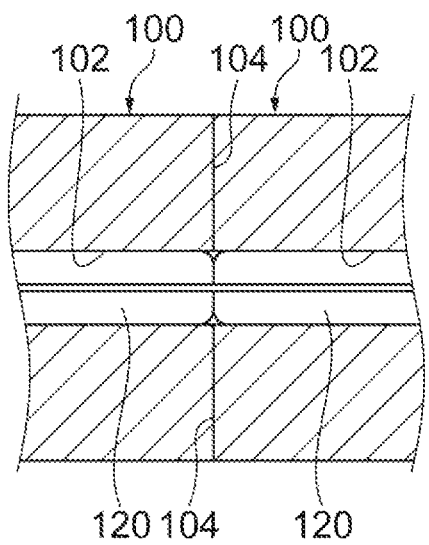
FIG. 7B is a sectional side view illustrating one example of the structure of the PC-type ferrule, which illustrates a state of being connected.

As a type of connecting optical fibers to each other with connectors, a physical contact (PC) type is generally known. FIG. 7A and FIG. 7B are sectional side views illustrating one example of a structure of PC-type ferrules. FIG. 7A illustrates a state before connection, and FIG. 7B illustrates a state of being connected. Each of these ferrules 100 has a cylindrical outer shape, and has a hole 102 for holding a bare optical fiber 120 on its central axis. The bare optical fiber 120 is disposed through the hole 102, and a tip portion thereof slightly protrudes from a tip surface 104 of each ferrule 100. In this PC type, a tip portion of a bare optical fiber 120 is brought into physical contact with and pressed against a tip portion of an optical fiber core of a counterpart connector to be connected (FIG. 7B), whereby the bare optical fiber 120 are optically coupled to each other in an efficient manner. This type is used mainly when single-core optical fibers are connected to each other.

This type has the following problems. If the optical fibers have been connected to each other with foreign matter attached to the ferrule end surfaces, the foreign matter will be caused to adhere to the ferrule end surfaces by the pressing force. A contact-type cleaner need to be used to remove such adhering foreign matter and frequent cleaning is necessary to prevent foreign matter from adhering. In addition, a predetermined pressing force is required for each fiber when optical fibers are simultaneously connected, and thus a larger number of optical fibers require greater force.

Figure 8:
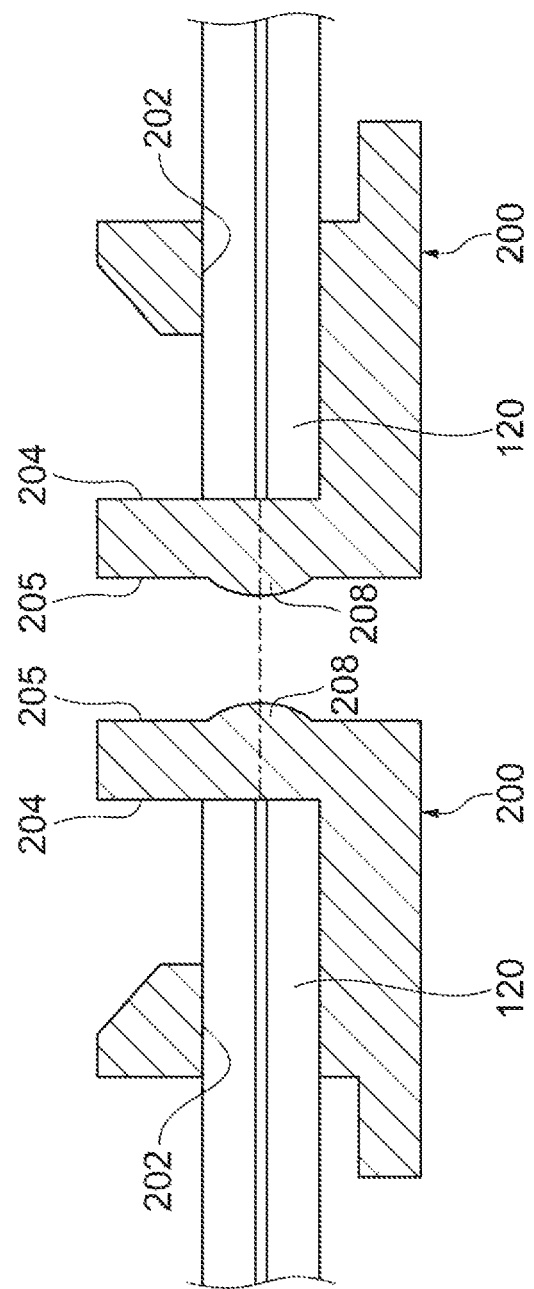
FIG. 8 is a sectional side view schematically illustrating a structure example of ferrules in which a clearance is formed between tip surfaces of optical fibers to be connected to each other and lenses are provided to areas in the clearance.

In view of the above problems, a type is used in which, as described in Patent Literature 1, for example, a clearance is formed between tip surfaces of optical fibers to be connected to each other and lenses are provided to areas in the clearance. FIG. 8 is a sectional side view schematically illustrating one example of such a ferrule structure. These ferrules 200 each have holes 202 for holding bare optical fibers 120, an inner surface 204 that contacts with tip portions of the optical fibers to position the tip portions, and lenses 208 provided in an end surface 205 and in front of the inner surface 204. This structure, however, needs to accurately align the positions of lenses 208 in addition to the positions of the bare optical fibers 120. Thus, the number of components requiring aligning operation increases, and accordingly position tolerances allowed for the respective components need to be smaller, which complicates the alignment process, thereby requiring a longer period of time.

The present disclosure has been made in view of the problems described above, and an object thereof is to provide an optical connector and an optical coupling structure in which a ferrule end surface can be easily cleaned, great force is not necessary for connection even when a plurality of optical fibers are simultaneously connected, and aligning operation is easy.

Advantage Effect of Disclosure

According to the present disclosure, an optical connector and an optical coupling structure can be provided in which a ferrule end surface can be easily cleaned, great force is not necessary for connection even when a plurality of optical fibers are simultaneously connected, and aligning operation is easy.

Description of Embodiments of Present Invention

Embodiments of the present invention will be described first by reciting the features thereof. An optical connector according to one embodiment of the present invention comprises an optical fiber, a ferrule that holds the optical fiber, the ferrule having a flat ferrule end surface facing a counterpart optical connector, and a spacer provided on the ferrule end surface so as to define a clearance between the ferrule end surface and the counterpart optical connector. A tip surface of the optical fiber is exposed at the ferrule end surface. Respective normal directions to the tip surface of the optical fiber and the ferrule end surface are inclined with respect to an optical-axis direction of the optical fiber in a section along an optical axis of the optical fiber. The spacer includes an opening configured to allow an optical path extending from the tip surface of the optical fiber to pass therethrough.

An optical coupling structure according to one embodiment of the present invention comprises first and second optical connectors configured to be connected to each other. The first and second optical connectors each comprise an optical fiber and a ferrule that hold the optical fiber, the ferrule having a flat ferrule end surface. The ferrule end surface of the first optical connector and the ferrule end surface of the second optical connector face each other. Tip surfaces of the optical fibers are exposed at the respective ferrule end surfaces of the first and second optical connectors, and respective normal directions to the tip surfaces of the optical fibers and the ferrule end surfaces are inclined with respect to an optical-axis direction of the optical fibers in a section along optical axes of the optical fibers. The optical coupling structure further comprises a spacer configured to define a clearance between the ferrule end surface of the first optical connector and the ferrule end surface of the second optical connector. The spacer has an opening configured to allow an optical path extending between the tip surface of the optical fiber of the first optical connector and the tip surface of the optical fiber of the second optical connector to pass therethrough.

The above-described optical connector provides the spacer that defines the clearance to the counterpart optical connector on the ferrule end surface. In the same manner, the above-described optical coupling structure provides the spacer that defines the clearance between the ferrule end surface of the first optical connector and the ferrule end surface of the second optical connector. By this configuration, a predetermined clearance between the ferrule end surface and the counterpart optical connector (or between the ferrule end surfaces of the first and second optical connectors) can be easily formed. Thus, a non-contact optical connection structure can be made, and the ferrule end surface can be easily cleaned (or the need for cleaning can be eliminated). In addition, great force is not necessary for connection unlike the PC type, and a plurality of optical fibers can be simultaneously connected. Furthermore, the number of optical components existing in the optical path can be reduced because no lens is interposed between the connectors, and thus optical connection loss can be reduced.

In the above-described optical connector, the respective normal directions to the tip surface of each optical fiber and the corresponding ferrule end surface are inclined with respect to the optical-axis direction of the optical fiber. By this configuration, reflected return light at the tip surface of the optical fiber can be reduced. In the optical connector, the spacer and each ferrule are different members, and thus each ferrule end surface and the tip surface of the corresponding optical fiber that are inclined can be easily formed by polishing, for example.

In the above-described optical connector, a pair of guide holes may be formed in the ferrule end surface alongside a direction intersecting the section, the pair of guide holes configured to insert each of guide pins thereinto, and the center of the tip surface of the optical fiber may be displaced from a line connecting the centers of the pair of guide holes at the ferrule end surface. In the optical connector, the normal direction to the tip surface of the optical fiber is inclined with respect to the optical-axis direction of the optical fiber. Thus, due to refraction at the tip surface, the optical path extending from the tip surface of the optical fiber is tilted with respect to the optical axis of the optical fiber. Even in this configuration, displacement of the center of the tip surface of the optical fiber from the line connecting the centers of the pair of guide holes suitably enables optical coupling between the optical fiber and an optical fiber of the counterpart optical connector having the same configuration.

In the above-described optical connector, a pair of guide holes may be formed in the ferrule end surface alongside a direction intersecting the section, the pair of guide holes configured to insert each of guide pins thereinto, and the spacer may further include a pair of through holes through which the guide pins pass. By this configuration, the spacer can be stably held by the guide pins.

In the section, the optical axis of the optical fiber may be inclined with respect to a connection direction, and the optical path extending from the tip surface of the optical fiber may extend along the connection direction. When the normal direction to the tip surface of the optical fiber is inclined with respect to the optical-axis direction of the optical fiber as in the above-described optical connector, even with this configuration, optical coupling to the counterpart optical connector can be suitably performed.

In the above-described optical connector, thickness of the spacer in a connection direction may be 20 μm or greater and 100 μm or smaller. Such a thin spacer enables light emitted from the tip surface of the optical fiber to reach the tip surface of the optical fiber of the counterpart optical connector before the diameter of the light spreads, which can prevent efficiency of the optical coupling from decreasing. In general, the end surface of a connector is a surface that is inclined at 8° in order to reduce reflected return light, and if the optical connectors are brought closer to each other with a clearance therebetween less than 20 μm, multiple reflection may occur due to influence of the reflected return light, thereby causing optical properties to deteriorate. In view of this, the end surface angle is set larger than 8°, whereby multiple reflection can be prevented even if the thickness of the spacer is set within a range of from 10 μm to 20 μm, and thus optical connection loss can be further reduced.

Details of Embodiments of Present Invention

Specific examples of the optical connector and the optical coupling structure according to the embodiments of the present invention will be described hereinafter with reference to the drawings. It should be noted that the present invention is not limited to these examples, is described by the claims, and is intended to include meanings equivalent to the claims and all changes within the scope of the claims. Hereinafter, in the description of the drawings, like elements are designated by like reference signs, and duplicate explanation is omitted.

Figure 1:
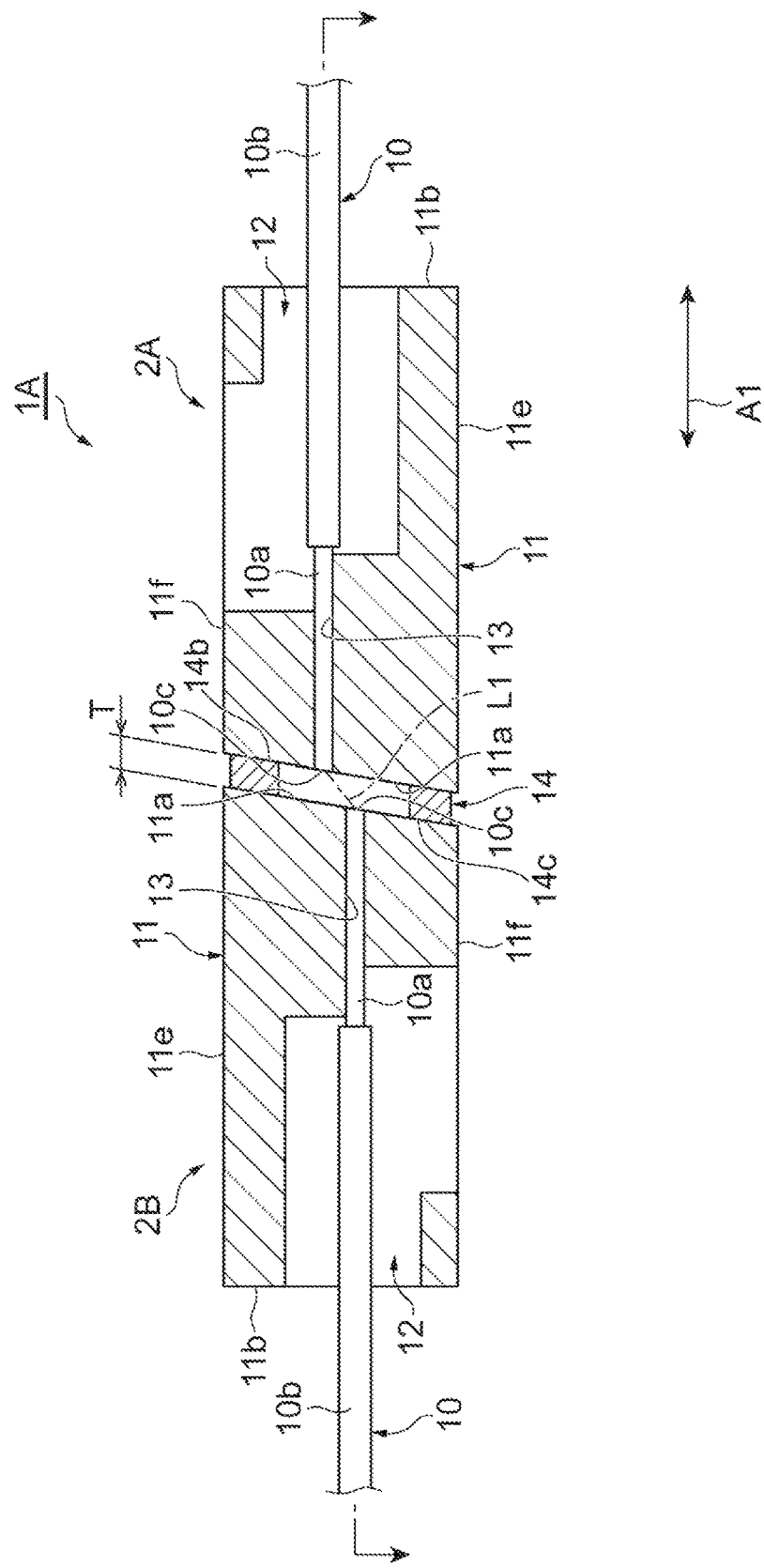
FIG. 1 is a sectional side view illustrating a configuration of an optical coupling structure according to one embodiment of the present invention.
Figure 2:
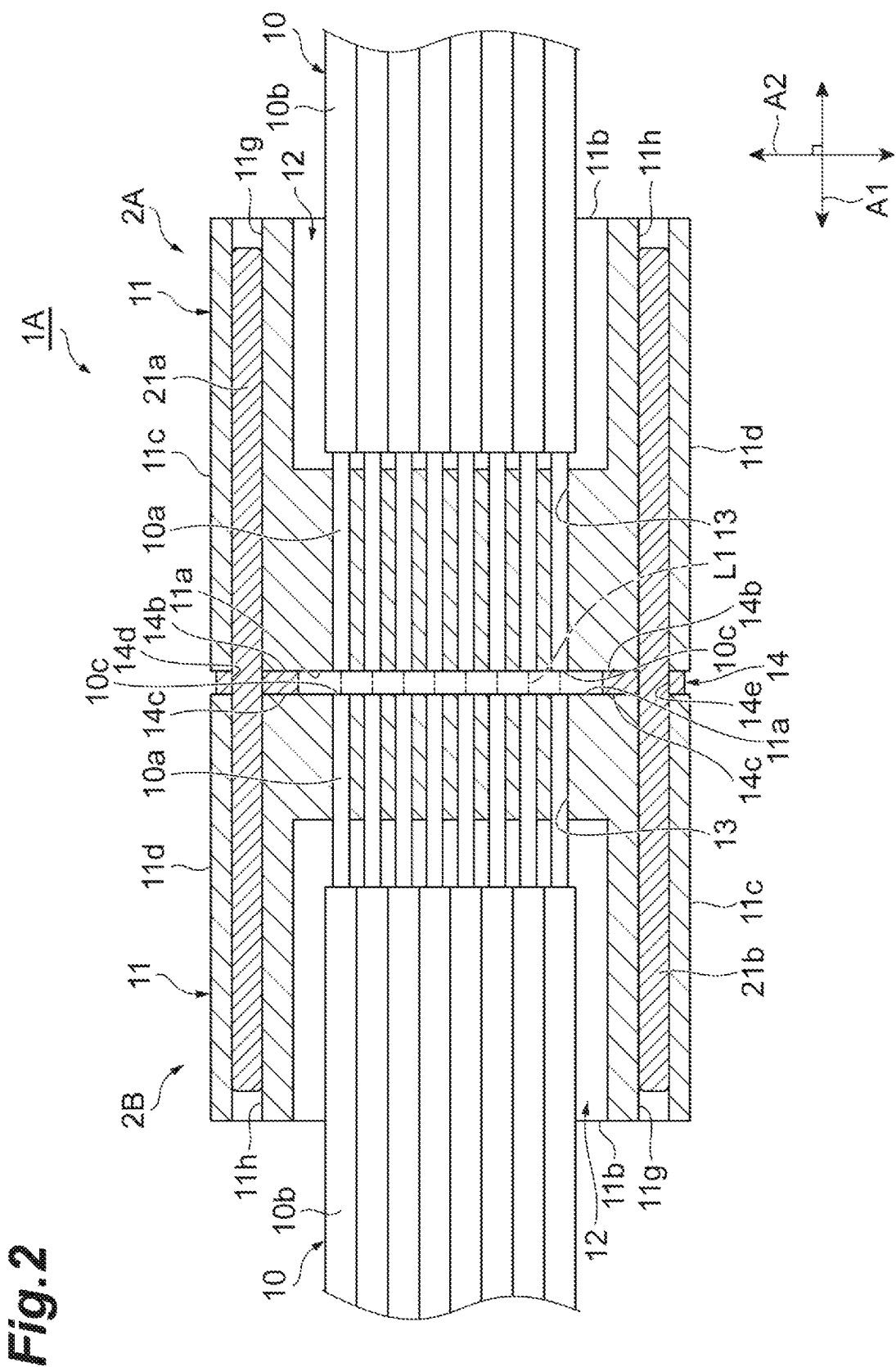
FIG. 2 is a sectional view of the optical coupling structure along line II-II of FIG. 1.

FIG. 1 is a sectional side view illustrating a configuration of an optical coupling structure 1A according to one embodiment of the present invention, which illustrates a section along optical axes of optical fibers 10. FIG. 2 is a sectional view of the optical coupling structure 1A along line II-II of FIG. 1. As depicted in FIG. 1 and FIG. 2, the optical coupling structure 1A of the present embodiment includes a first optical connector 2A and a second optical connector 2B configured to be connected to each other.

The optical connectors 2A and 2B each include a plurality of (eight exemplified in FIG. 2) optical fibers 10 and a ferrule 11 configured to hold the optical fibers 10 together. The optical fibers 10 each extend along a connection direction (arrow A1 in FIG. 1 and FIG. 2), and are disposed so as to arrange side by side in a direction A2 intersecting the connection direction A1. Each optical fiber 10 includes a bare optical fiber 10a and a resin coating 10b covering the bare optical fiber 10a, and the bare optical fiber 10a is exposed from a certain point thereof in the connection direction to a tip surface 10c thereof by removing the resin coating 10b. The number of optical fibers 10 is not limited to eight, and may be 12 or 24, for example.

Each ferrule 11 has a substantially rectangular-parallelepiped outer shape, and is formed of resin, for example. The ferrule 11 has a flat ferrule end surface 11a formed on its one end side in the connection direction A1 and a rear end surface 11b formed on the other end side. The ferrule 11 has a pair of side surfaces 11c and 11d, a bottom surface 11e, and an upper surface 11f that extend along the connection direction A1. The ferrule end surface 11a of the optical connector 2A and the ferrule end surface 11a of the optical connector 2B face each other. In each of these ferrule end surfaces 11a, a pair of guide holes 11g and 11h are formed that are arranged side by side in a direction intersecting the section along the optical axes of the optical fibers. 10 (the direction A2 in the present embodiment). Each of a pair of guide pins 21a and 21b (see FIG. 2) is inserted into each of these guide holes 11g and 11h. The pair of guide pins 21a and 21b fix the relative position between the optical connector 2A and the optical connector 2B.

An introduction hole 12 configured to receive a plurality of optical fibers 10 together is formed in each rear end surface 11b. A plurality of optical-fiber holding holes 13 are formed so as to penetrate from the introduction hole 12 to the ferrule end surface 11a. The respective bare optical fibers 10a are inserted in the respective optical-fiber holding holes 13 to be held. The tip surfaces 10c of the respective bare optical fibers 10a are exposed at the ferrule end surface 11a, and are preferably flush with the ferrule end surface 11a. These tip surfaces 10c are optically coupled to the tip surfaces 10c of the respective bare optical fibers 10a of the counterpart connector directly without an optical component such as a lens or a refractive-index matching agent, for example, interposed therebetween (with only air therebetween). Thus, light emitted from the tip surfaces 10c of one optical connector enters the tip surfaces 10c of the other optical connector while spreading to a certain extent.

Figure 3:
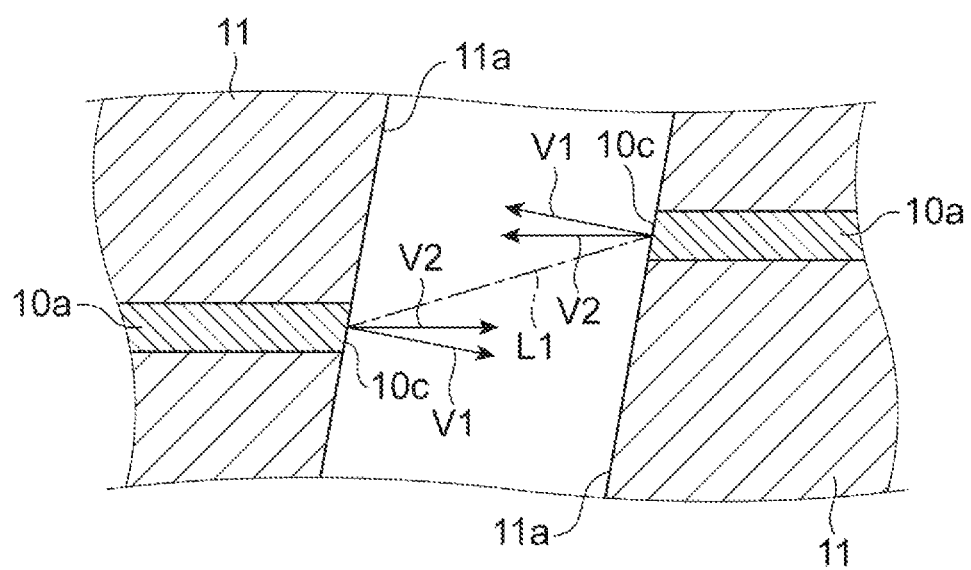
FIG. 3 is a sectional view illustrating a vicinity of tip surfaces of optical fibers in an enlarged manner.

FIG. 3 is a sectional view illustrating a vicinity of tip surfaces 10c of optical fibers 10 in an enlarged manner. As depicted in FIG. 3, the normal direction V1 to the tip surface 10c of each optical fiber 10 and the corresponding ferrule end surface 11a is inclined with respect to the optical-axis direction V2 of the optical fiber 10, in a section along the optical axes of the optical fibers 10. By this inclination, reflected return light at the tip surface 10c is reduced. In this case, an optical path L1 of light emitted from the tip surface 10c of the optical fiber 10 is refracted at the tip surface 10c toward a direction opposite to a direction toward which the tip surface 10c is inclined.

Figure 4:
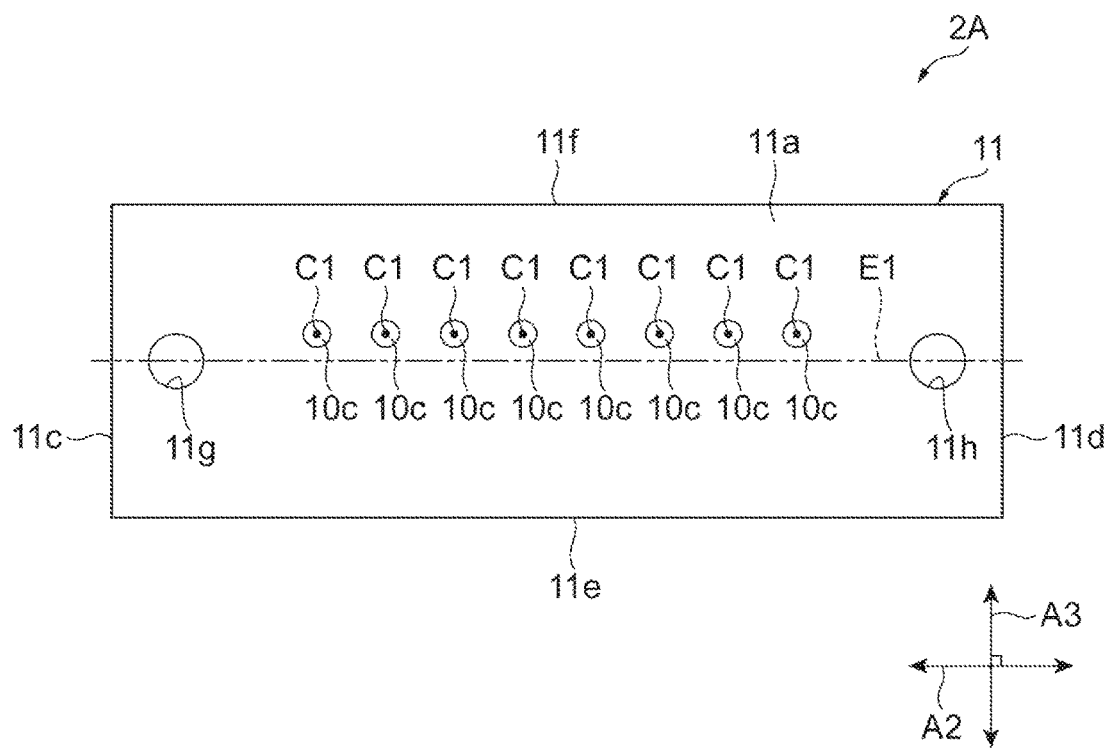
FIG. 4 is a front view illustrating a ferrule end surface.

FIG. 4 is a front view illustrating each ferrule end surface 11a. As depicted in FIG. 4, centers C1 of the tip surfaces 10c of the optical fibers 10 are displaced slightly upward from the line E1 connecting the centers of the pair of guide holes 11g and 11h at the ferrule end surface 11a. In other words, in a direction A3 (i.e., a vertical direction of the ferrule 11) intersecting both of the directions A1 and A2, central axes of the optical fibers 10 are slightly displaced toward the upper surface 11f with respect to the center of the ferrule 11. Thus, even when the optical path L1 is refracted, the optical connectors 2A and 2B are connected in a manner vertically flipped with respect to each other, whereby the optical axes of the corresponding respective optical fibers 10 are vertically displaced from each other, and thus these optical fibers 10 can be optically coupled to each other suitably.

Figure 5:
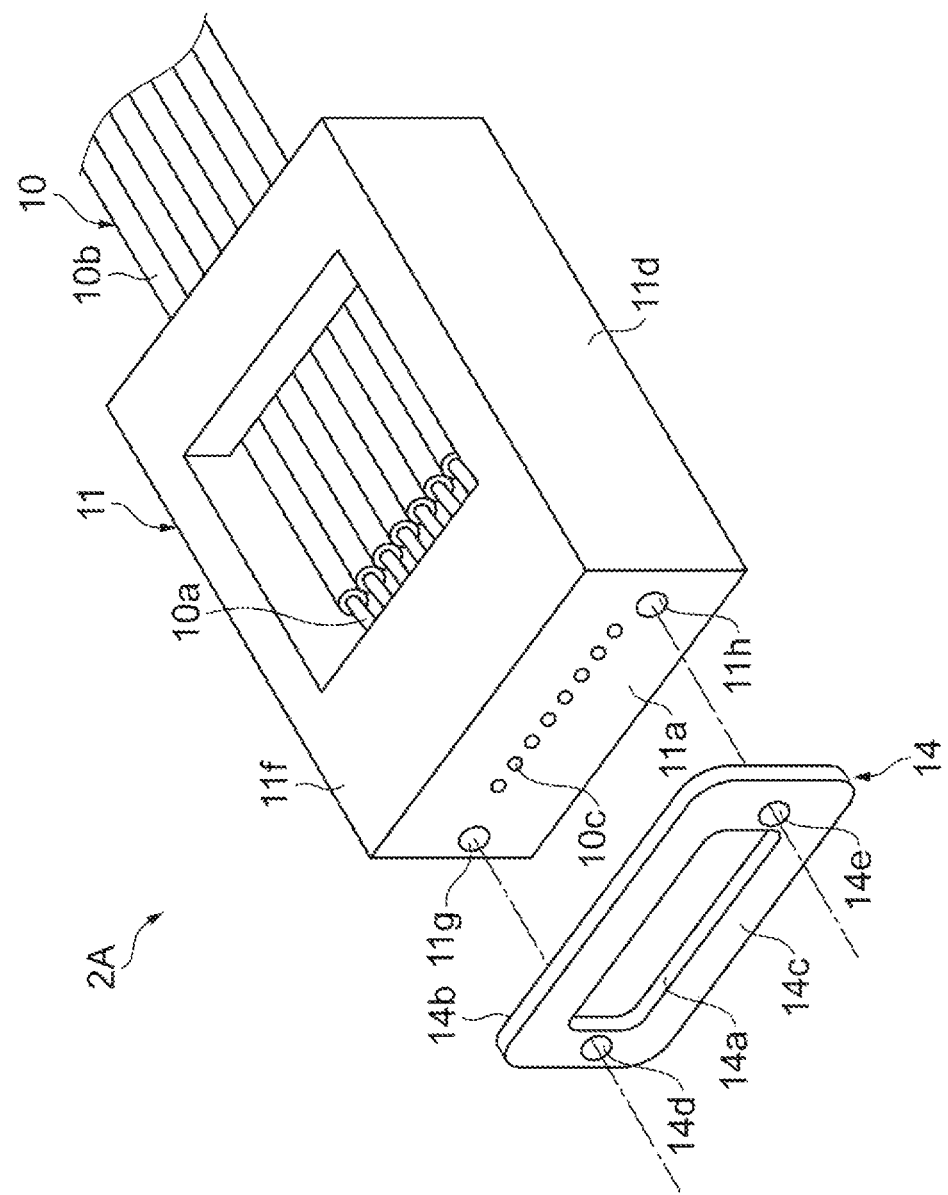
FIG. 5 is an exploded perspective view of a spacer and a ferrule.

The optical connector 2A further includes a spacer 14. FIG. 5 is an exploded perspective view of the spacer 14 and the ferrule 11. The spacer 14 is provided on the ferrule end surface 11a to define a clearance between this ferrule end surface 11a and the ferrule end surface 11a of the optical connector 2B. Specifically, the spacer 14 has a plate-like shape having an opening 14a, and one surface 14b thereof is in contact with the ferrule end surface 11a of the optical connector 2A to adhere thereto. The other surface 14c is brought into contact with the ferrule end surface 11a of the optical connector 2B when the optical connector 2A is connected to the optical connector 2B. The adhering herein is not limited to adhesion using adhesive, and may be physical adhesion, chemical adhesion, dispersive adhesion, electrostatic adhesion, or welding. The opening 14a allows a plurality of optical paths L1, extending between the respective tip surfaces 10c of the optical fibers 10 of the optical connector 2A and the respective tip surfaces 10e of the optical fibers 10 of the optical connector 2B, to pass therethrough. The thickness T (see FIG. 1) of the spacer 14 in the connection direction A1 is 20 μm or greater and 100 μm or smaller, for example. The thickness T of the spacer 14 may be reduced to 10 μm when the inclination angle of the ferrule end surfaces 11a is set larger than 8°. In other words, the thickness T of the spacer 14 may be 10 μm or greater and 100 μm or smaller, for example. Material forming the spacer 14 is preferably the same as the material of the ferrule 11, and is preferred to be polyphenylene sulfide (PPS) containing glass filler, for example. The ferrule 11 and the spacer 14 may be formed of different materials.

The spacer 14 further includes a pair of through holes 14d and 14e through which the guide pins 21a and 21b respectively pass. By this configuration, the spacer 14 is stably held by the guide pins 21a and 21b in a state in which the optical connectors 2A and 2B are connected to each other.

The following describes effects obtained by the optical coupling structure 1A and the optical connector 2A according to the present embodiments described above. The optical connector 2A of the present embodiment provides the spacer 14 to define the clearance to the counterpart optical connector (optical connector 2B) on the ferrule end surface 11a. In the same manner, the optical coupling structure 1A provides the spacer 14 to define the clearance between the ferrule end surface 11a of the optical connector 2A and the ferrule end surface 11a of the optical connector 2B. By this configuration, a predetermined clearance can be easily formed between the ferrule end surface 11a and the counterpart optical connector (or between the ferrule end surfaces 11a of the first and second optical connectors 2A and 2B). Thus, the embodiments make a non-contact optical connection structure to reduce adhesion of foreign matter, whereby the ferrule end surface 11a can be easily cleaned (e.g., with an air duster) or the need for cleaning can be eliminated. In addition, the embodiments can make many optical fibers 10 simultaneously connect with each other without requiring great force, unlike the PC type. Furthermore, the embodiments can reduce the number of optical components existing in the optical paths because no lens is interposed between the connectors. Thus, the embodiments can reduce optical connection loss, and can facilitate the alignment process and reduce the number of manufacturing steps so as to reduce cost to lower levels.

In the present embodiments, the respective normal directions to the tip surface 10c of each optical fiber 10 and the corresponding ferrule end surface 11a are inclined with respect to the optical-axis direction of the optical fiber 10 (see FIG. 3). This configuration can reduce reflected return light at the tip surface 10c of the optical fiber 10. The spacer 14 and each ferrule 11 are different members, and thus each ferrule end surface 11a and the tip surfaces 10c of the corresponding optical fibers 10 that are inclined can be easily formed by polishing, for example.

As in the present embodiments, the centers C1 of the tip surfaces 10c of optical fibers 10 may be displaced from the line E1 connecting the centers of the pair of the guide holes 11g and 11h at a ferrule end surface 11a. As described above, since the normal direction to the tip surface 10c of each optical fiber 10 is inclined with respect to the optical-axis direction of the optical fiber 10, the optical path L1 extending from the tip surface 10c of the optical fiber 10 is tilted with respect to the optical axis of the optical fiber 10, due to refraction at the tip surface 10c. Even in this configuration, displacement of the centers C1 of the tip surfaces 10c of the optical fibers 10 from the line E1 connecting the centers of the pair of guide holes 11g and 11h suitably enables optical coupling between the optical fibers 10 of the optical connectors 2A and 2B having the same configuration.

As in the present embodiments, the thickness of the spacer 14 in the connection direction A1 may be 20 μm or greater and 100 μm or smaller. Furthermore, the thickness of the spacer 14 in the connection direction A1 may be reduced to 10 μm when the inclination angle of the ferrule end surface 11a is set larger than 8°. Making the spacer 14 so thin enables light emitted from the tip surface 10c of the optical fiber 10 to reach the tip surface 10c of the optical fiber 10 of the counterpart optical connector (optical connector 2B) before the diameter of the light spreads, which can prevent efficiency of the optical coupling from decreasing.

Modifications

Figure 6:
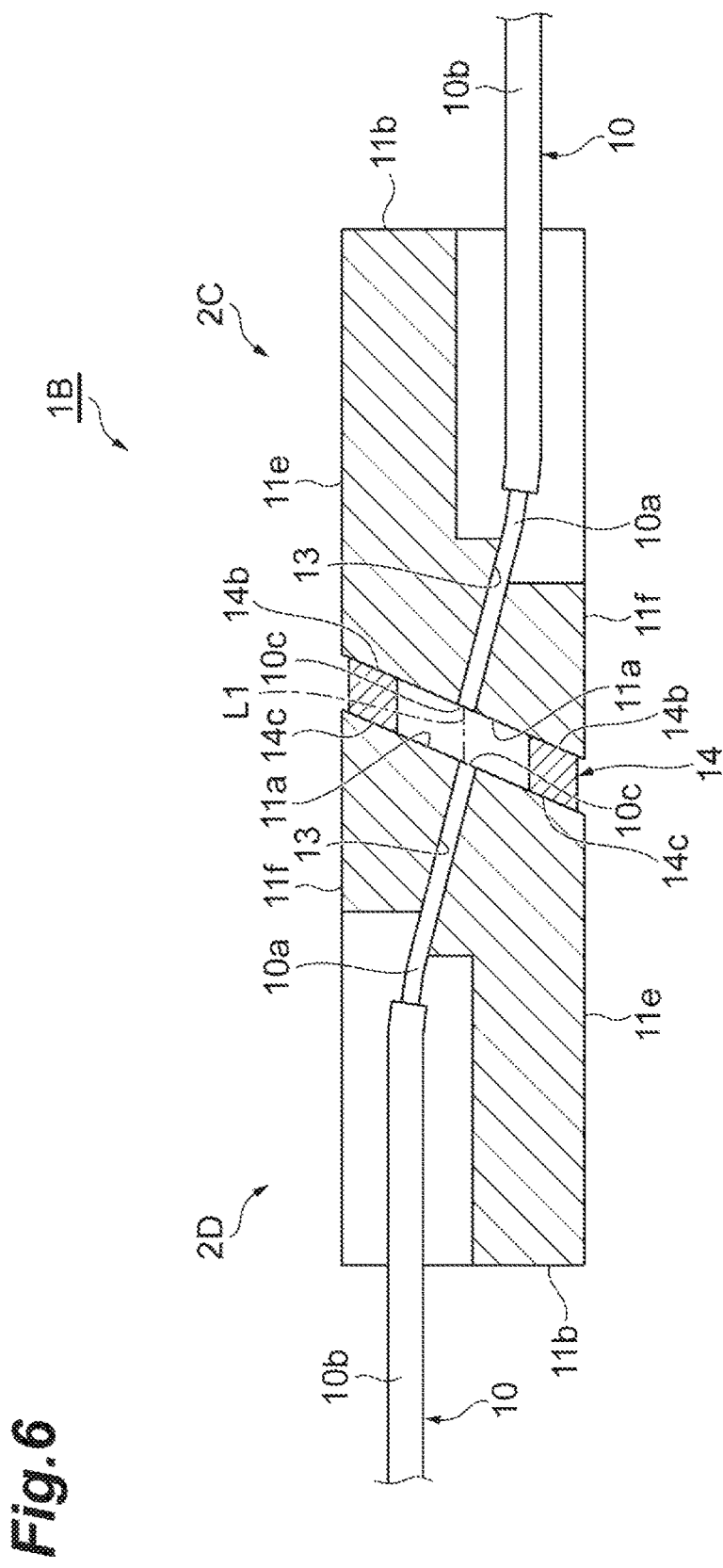
FIG. 6 is a sectional side view illustrating a configuration of an optical coupling structure according to one modification.

FIG. 6 is a sectional side view illustrating a configuration of an optical coupling structure 1B according to one modification of the above-described embodiments, which illustrates a section along the optical axes of the optical fibers 10. As depicted in FIG. 6, the optical coupling structure 1B of the present embodiment includes a first optical connector 2C and a second optical connector 2D configured to be connected to each other.

Optical connectors 2C and 2D of the present modification are different from the optical connectors 2A and 2B of the above-described embodiments in angle of the optical-axis direction of the bare optical fibers 10a with respect to the connection direction A1. Specifically, in the present modification, the optical axes of the bare optical fibers 10a are inclined with respect to the connection direction A1 in a section along the optical axes of the bare optical fibers 10a. In other words, the optical axes of the bare optical fibers 10a are inclined with respect to the extending direction of the guide holes 11g and 11h (see FIG. 2). Thus, the optical paths L1 extending from the tip surfaces 10c of the optical fibers 10 extend along (parallel to) the connection direction A1.

As depicted in FIG. 3, when the normal direction V1 to the tip surface 10c of each optical fiber 10 is inclined with respect to the optical-axis direction V2 of the optical fiber 10, the optical connectors 2C and 2D can be optically coupled suitably even in the configuration of the present modification. Specifically, by suitably selecting the angle of the ferrule end surfaces 11a and the angle of the optical axes of the optical fibers 10 (the angle of the optical-fiber holding holes 13), the extending direction of the optical path L1 can be set at any angle with respect to the connection direction A1. When the optical path L1 is set so as to extend along the connection direction A1 as in the present modification, the margin of tolerance of relative position between the optical connectors 2C and 2D in the connection direction A1 can be widened.

The optical connector and the optical coupling structure according to the present invention are not limited to those in the above-described embodiments, and various other changes can be made. For example, the respective embodiments above may be used in combination with each other depending on required purposes and effects. In the above-described embodiments, the clearance between the ferrule end surfaces is filled with air. However, this filler is not limited to air, and may be any medium having a uniform refractive index. In the above-described embodiments, the present invention is applied to a multi-fiber optical connector. However, the present invention can be applied also to a single-fiber optical connector.

REFERENCE SIGNS LIST 1A, 1B . . . optical coupling structure, 2A, 2B, 2C, 2D . . . optical connector, 10 . . . optical fiber, 10a . . . bare optical fiber, 10b . . . resin coating, 10c . . . tip surface, 11 . . . ferrule, 11a . . . ferrule end surface, 11g, 11h . . . guide hole, 12 . . . introduction hole, 13 . . . optical-fiber holding hole, 14 . . . spacer, 14a . . . opening, 14d, 14e . . . through hole, 21a, 21b . . . guide pin, A1 . . . connection direction, L1 . . . optical path

The invention claimed is:

1. An optical connector comprising:
an optical fiber;
a ferrule that holds said optical fiber, said ferrule having a flat ferrule end surface facing a counterpart optical connector; and
a spacer provided on said ferrule end surface so as to define a clearance between said ferrule end surface and said counterpart optical connector,
wherein a tip surface of said optical fiber is exposed at said ferrule end surface,
wherein respective normal directions to said tip surface of said optical fiber and said ferrule end surface are inclined with respect to an optical-axis direction of said optical fiber in a section along an optical axis of said optical fiber,
wherein said spacer has a plate-like shape,
wherein said spacer is welded to said ferrule end surface,
wherein said spacer includes an opening configured to allow an optical path extending from said tip surface of said optical fiber to pass therethrough,
wherein a pair of guide holes are formed in said ferrule end surface alongside a direction intersecting said section along said optical axis of said optical fiber, said pair of guide holes configured to insert each of guide pins thereinto, and
wherein the center of said tip surface of said optical fiber is displaced from a line connecting the centers of said pair of guide holes at said ferrule end surface.

2. The optical connector according to claim 1,
wherein said spacer further includes a pair of through holes through which said guide pins pass.

3. The optical connector according to claim 1,
wherein said optical axis of said optical fiber is inclined with respect to a connection direction in said section, and
wherein said optical path extending from said tip surface of said optical fiber extends along said connection direction.

4. The optical connector according to claim 1,
wherein a thickness of said spacer in a connection direction is 10 μm or greater and 100 μm or smaller.

5. The optical connector according to claim 1,
wherein said tip surface of said optical fiber is flush with said ferrule end surface.

6. The optical connector according to claim 1,
wherein said spacer is formed of a same material as that of said ferrule.

7. An optical coupling structure comprising first and second optical connectors configured to be connected to each other, wherein
said first and second optical connectors each comprise an optical fiber and a ferrule that holds said optical fiber, said ferrule having a flat ferrule end surface,
said ferrule of said first optical connector and said ferrule of said second optical connector are coupled in a manner vertically flipped with respect to each other,
said ferrule end surface of said first optical connector and said ferrule end surface of said second optical connector face each other,
tip surfaces of said optical fibers are exposed at the respective ferrule end surfaces of said first and second optical connectors, and respective normal directions to said tip surfaces of said optical fibers and said ferrule end surfaces are inclined with respect to an optical-axis direction of said optical fibers in a section along optical axes of said optical fibers,
said optical coupling structure further comprises a spacer configured to define a clearance between said ferrule end surface of said first optical connector and said ferrule end surface of said second optical connector, wherein said spacer has a plate-like shape, said spacer is welded to said ferrule end surface of said first optical connector, and said spacer has an opening configured to allow an optical path extending between said tip surface of said optical fiber of said first optical connector and said tip surface of said optical fiber of said second optical connector to pass therethrough, and
one surface of said spacer is in contact with said ferrule end surface of said first optical connector, and the other surface of said spacer is in contact with said ferrule end surface of said second optical connector.

8. The optical coupling structure according to claim 7,
wherein said tip surface of said optical fiber of said first optical connector is optically coupled to said tip surface of said optical fiber of said second optical connector in said opening with only air therebetween.

9. An optical connector comprising:
an optical fiber;
a ferrule that holds said optical fiber, said ferrule having a flat ferrule end surface facing a counterpart optical connector; and
a spacer provided on said ferrule end surface so as to define a clearance between said ferrule end surface and said counterpart optical connector,
wherein a tip surface of said optical fiber is exposed at said ferrule end surface,
wherein respective normal directions to said tip surface of said optical fiber and said ferrule end surface are inclined with respect to an optical-axis direction of said optical fiber in a section along an optical axis of said optical fiber,
wherein one surface of said spacer is in contact with said ferrule end surface,
wherein said spacer is welded to said ferrule end surface,
wherein said spacer includes an opening configured to allow an optical path extending from said tip surface of said optical fiber to pass therethrough,
wherein a pair of guide holes are formed in said ferrule end surface alongside a direction intersecting said section along said optical axis of said optical fiber, said pair of guide holes configured to insert each of guide pins thereinto, and
wherein the center of said tip surface of said optical fiber is displaced from a line connecting the centers of said pair of guide holes at said ferrule end surface.

10. The optical connector according to claim 9,
wherein said spacer further includes a pair of through holes through which said guide pins pass.

11. The optical connector according to claim 9,
wherein said optical axis of said optical fiber is inclined with respect to a connection direction in said section, and
wherein said optical path extending from said tip surface of said optical fiber extends along said connection direction.

12. The optical connector according to claim 9,
wherein a thickness of said spacer in a connection direction is 10 μm or greater and 100 μm or smaller.

13. The optical connector according to claim 9,
wherein said tip surface of said optical fiber is flush with said ferrule end surface.

14. The optical connector according to claim 9,
wherein said spacer is formed of a same material as that of said ferrule.

\* \* \* \* \*